(No Model.)

C. S. COOM.
COMBINATION SAWING AND PLANING DEVICE.

No. 589,699. Patented Sept. 7, 1897.

Witnesses:
Charles W. Brooke
Jno. R. Price

Inventor
Chas. S. Coom
by
G. B. Price
Attorney

THE NORRIS PETERS CO., PHOTO-LITHO., WASHINGTON, D. C.

UNITED STATES PATENT OFFICE.

CHARLES S. COOM, OF PHILADELPHIA, PENNSYLVANIA.

COMBINATION SAWING AND PLANING DEVICE.

SPECIFICATION forming part of Letters Patent No. 589,699, dated September 7, 1897.

Application filed April 19, 1897. Serial No. 632,787. (No model.)

*To all whom it may concern:*

Be it known that I, CHARLES S. COOM, a citizen of the United States, residing at Philadelphia, in the county of Philadelphia and State of Pennsylvania, have invented a new and useful Combination Sawing and Planing Device, of which the following is a specification.

My invention relates to a method of simultaneously sawing and planing the sawed surface of boards by rapidly-revolving circular saw and cutting-disks firmly attached to the saw-arbor, as hereinafter described.

Figure 1:
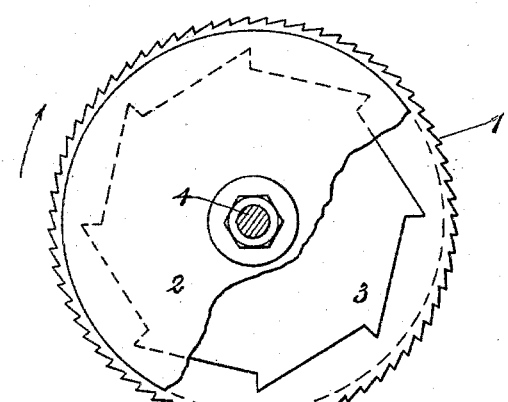
Figure 2:
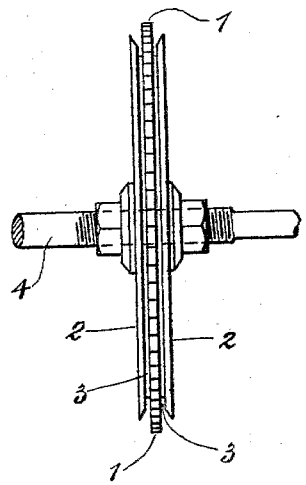
Figure 3:
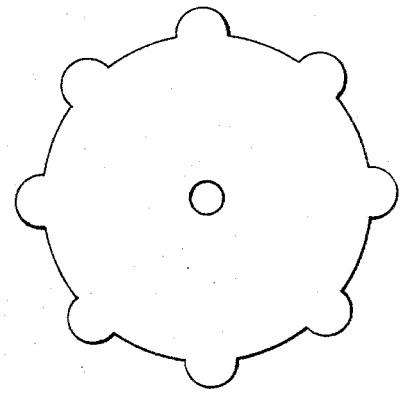

In the accompanying drawings, Figure 1 shows a side view of my invention with one of the outer disks partly broken away to disclose the next underlying disk. Fig. 2 shows an edge view of the several disks and their arrangement upon the saw-arbor. Fig. 3 is simply a modified form of the outer disks 2 shown in Figs. 1 and 2 and would substitute for them, taking the same positions as 2 2 on the arbor when so preferred.

Referring to the drawings, the usual circular saw 1 will be seen to occupy a mid-position on the arbor 4. Lying next to both faces of the saw 1 are the separating-disks 3 3, which may also have their peripheries notched out, as shown in Fig. 1. Outside of the disks 3 3 and lying against their outer faces come the cutting or planing disks 2 2, the peripheries of which are sharpened to a knife-edge, either in one continuous circle, as shown in Fig. 1 at 2, or tooth-shaped, as shown in Fig. 3. The four disks and the saw are firmly clamped together and revolved as one whole about a common axis, fastened to the saw-arbor 4 in the relative positions shown in Fig. 2.

My device is particularly applicable to sawing up into strips such thin wood boards as are used in making cigar-boxes, and it will be seen that what I aim to accomplish is not only sawing the boards apart but to plane off the sawed edges as rapidly as the saw-cut is made, thus leaving the boards perfectly smoothed and finished to the required width in one operation instead of two, as at present. With this in mind the relative functions of the saw and cutting-disks will be understood as follows:

The board to be cut is fed toward the revolving saw 1 in the usual manner. The slit opened in the board by the saw-teeth is immediately pared or planed off by the smoother revolving knife-edges of the disks 2 2, the diameter of these disks being somewhat less than that of the saw 1. The disks 3 3 separate the knife-edge disks the required distance from the saw, and serve also when notched out, as shown, to assist in carrying out of the saw-slit any shavings as they are pared off by the revolving knives.

Having described my invention, what I claim as new and original, and desire to secure by Letters Patent, is—

A circular saw combined with two external longitudinally-separated cutting disks or plates and two intermediate disks having notched edges, arranged to be clamped together on a common arbor; substantially as shown.

CHAS. S. COOM.

Witnesses:
CHARLES W. BROOKS,
JOS. N. PRICE.